United States Patent
VanOrden et al.

(10) Patent No.: US 7,368,835 B2
(45) Date of Patent: May 6, 2008

(54) POWER DISTRIBUTION SYSTEM AND METHOD

(75) Inventors: David R. VanOrden, Bedford, TX (US); Andrew G. Low, Southlake, TX (US); Thyagarajan Ramachandran, Arlington, TX (US); Jose A. Garcia, Frisco, TX (US); Monty C. Carpenter, Lewisville, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 399 days.

(21) Appl. No.: 11/111,004

(22) Filed: Apr. 21, 2005

(65) Prior Publication Data

US 2005/0251295 A1 Nov. 10, 2005

Related U.S. Application Data

(60) Provisional application No. 60/568,661, filed on May 6, 2004.

(51) Int. Cl.
*H02J 7/00* (2006.01)
(52) U.S. Cl. ...................................................... 307/64
(58) Field of Classification Search ................... 307/64
See application file for complete search history.

(56) References Cited

U.S. PATENT DOCUMENTS

| | | | | |
|---|---|---|---|---|
| 4,590,554 | A * | 5/1986 | Glazer et al. | 714/13 |
| 6,490,277 | B1 * | 12/2002 | Tzotzkov | 370/360 |
| 7,099,340 | B2 * | 8/2006 | Liva et al. | 370/401 |

* cited by examiner

*Primary Examiner*—Robert L. Deberadinis
(74) *Attorney, Agent, or Firm*—Baker Botts L.L.P.

(57) ABSTRACT

A backplane in a power distribution shelf has power outputs connected to corresponding primary card slots and adjacent card slots. Power distribution cards are seated in the card slots. A maintenance card can be configured to selectively provide redundant power to the power outputs of a failed power distribution circuit card via an adjacent power distribution circuit card and a maintenance connection.

26 Claims, 8 Drawing Sheets

POWER DISTRIBUTION SYSTEM AND METHOD

This application claims the benefit of U.S. Provisional Application Ser. No. 60/568,661, filed on May 6, 2004, the entire disclosure of which is incorporated herein by reference.

This patent application generally relates to power distribution systems, and particularly relates to establishing redundant power distribution and facilitating maintenance operations in a communication system.

A communication system for providing voice, data and/or video communications to multiple subscribers may comprise a distribution unit and multiple remote network units. The distribution unit is centrally located, such as in a central office or in a roadside service cabinet, while the multiple remote network units are remotely located to provide voice, data and/or video communications to multiple subscribers. The remote units may receive both power and communication data from the distribution unit.

Often the distribution unit may comprise multiple power distribution circuit cards, each of which provides power to multiple remote network units. For example, each power distribution circuit card may provide power to eight remote network units, and the distribution unit may include 14 power distribution circuit cards, thus providing power to 112 remote network units. Each remote network unit, in turn, may service multiple subscribers.

Preventive maintenance and/or failure maintenance is required in all communication systems, during which service interruptions may occur. Because the distribution unit provides power to potentially multiple hundreds of subscribers, it is desirable to minimize service interruption to the fewest number of subscribers. Accordingly, disclosed herein are systems and methods for establishing redundant power distribution and for facilitating maintenance operations in a communication system.

DRAWINGS

DETAILED DESCRIPTION

Figure 1:
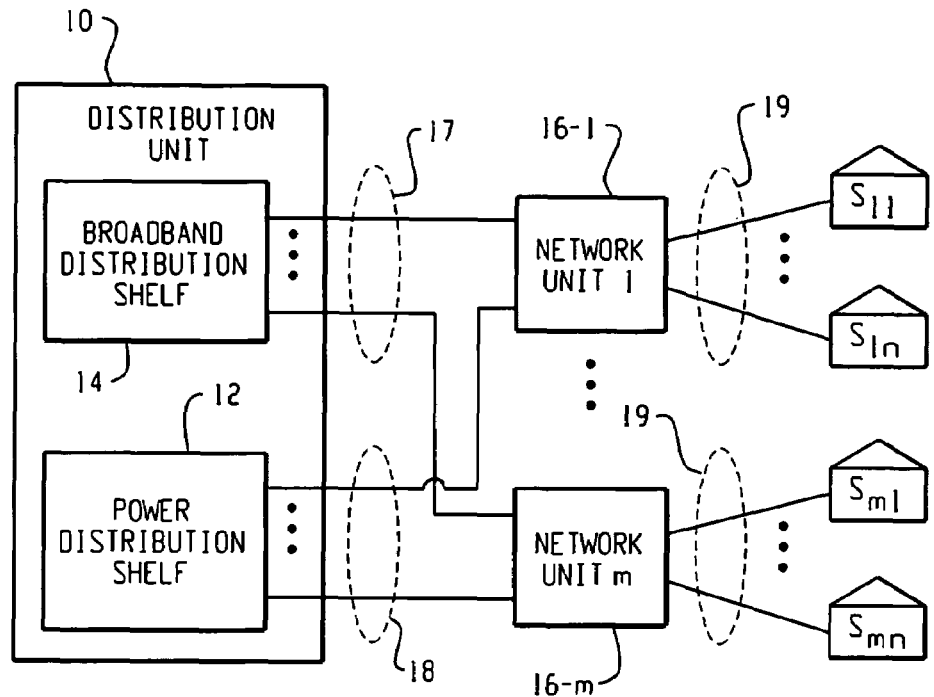
FIG. 1 is a block diagram of an example communication system.

FIG. 1 is a block diagram of an example communication system. The communication system comprises a distribution unit 10 and a plurality of network units 16-1 ... m. The distribution unit 10 may provide voice, data and/or video communications to each of the network units 16-1 ... m, which, in turn, may provide voice, data and/or video communications to a plurality of corresponding subscribers $S_{11}$-$S_{mn}$ via corresponding cables 19.

The distribution unit 10 includes a power distribution shelf 12 and a broadband distribution shelf 14. The broadband distribution shelf 14 facilitates voice, data and/or video communications to and from the network units 16-1 ... m via cables 17, and the power distribution shelf 12 provides power to the network units 16-1 ... m via cables 18.

The communication system of FIG. 1 may be implemented in a fiber optic based network, in which voice, data and/or video communications are transmitted to and from optical network units 16-1 ... m over fiber optic cables 17. The optical network units 16-1 ... m convert the optical communication data received from the broadband distribution shelf 14 into electrical communication signals and transmit the electrical communication signals to the corresponding subscribers $S_{11}$-$S_{mn}$ over corresponding copper cables 19. The copper cables 19 may include twisted pair cabling and coaxial cabling, or other copper-based communication wiring. The optical network units 16-1 ... m also convert the electrical communication data received from the subscribers $S_{11}$-$S_{mn}$ into optical communication signals and transmit the optical communication signals to the broadband distribution shelf 14.

The power distribution shelf 12 provides power to the optical network units 16-1 ... m via a corresponding plurality of conductors 18. In the system shown in FIG. 1, each conductor comprises a source and return pair, and the power distribution shelf 12 is an extended reach power distribution shelf that provides a line voltage of −185 VDC over conductor pairs 18. Previous optical communication systems provided a −140 VDC line voltage at the power distribution shelf 12, and thus the distance between each network unit 16 and the distribution unit 10 was limited to approximately 65 VDC in line drop. By increasing the line voltage to −185 VDC, the maximum allowable distance between each network unit 16 and the distribution unit 10 is extended. For example, the power distribution shelf 12 may support a service area of approximately 7.1 Kft on 22 AWG wire at a load of approximately 35 W per optical network unit 16. Lower line voltages, such as −140 VDC, may also be utilized, however.

Figure 2:
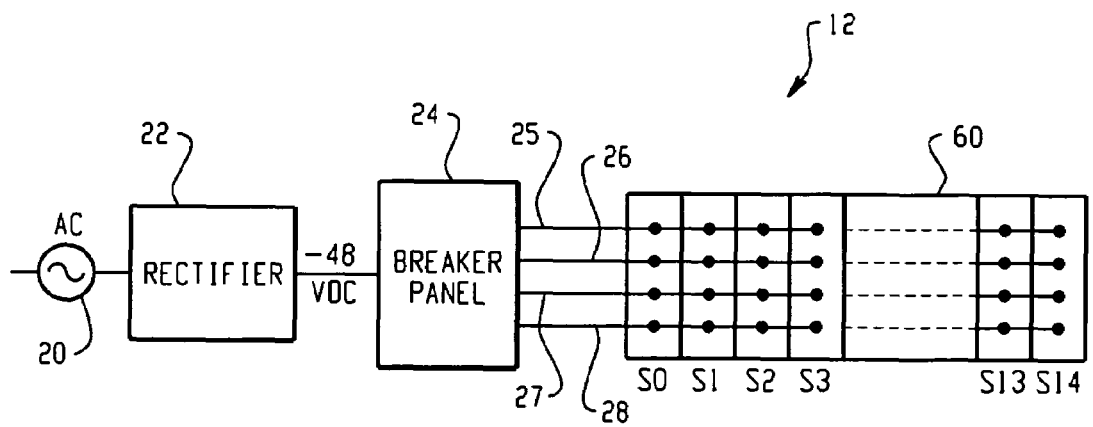
FIG. 2 is a block diagram of an example power distribution shelf used in the example communication system.

FIG. 2 is a block diagram of an example power distribution shelf 12. An AC power source 20 is coupled to a rectifier 22, which, in turn, produces a DC power output. In the example power distribution shelf 12 of FIG. 2, the rectifier 22 produces −48 VDC power. A breaker panel 24 is configured to receive the −48 VDC power as input and outputs four power feeds 25, 26, 27 and 28 to a backplane 60. A plurality of card slots S0-S14 are configured to receive a plurality of power distribution circuit cards, which, in turn, receive the −48 VDC power signal from the four power feeds 25, 26, 27 and 28 and output the −185 VDC line voltage. Lower line voltages, such as −140 VDC, may also be output, however. The rectifier 22, breaker panel 24, and backplane 16 may all be attached to a power distribution shelf 12 chassis.

Figure 3:
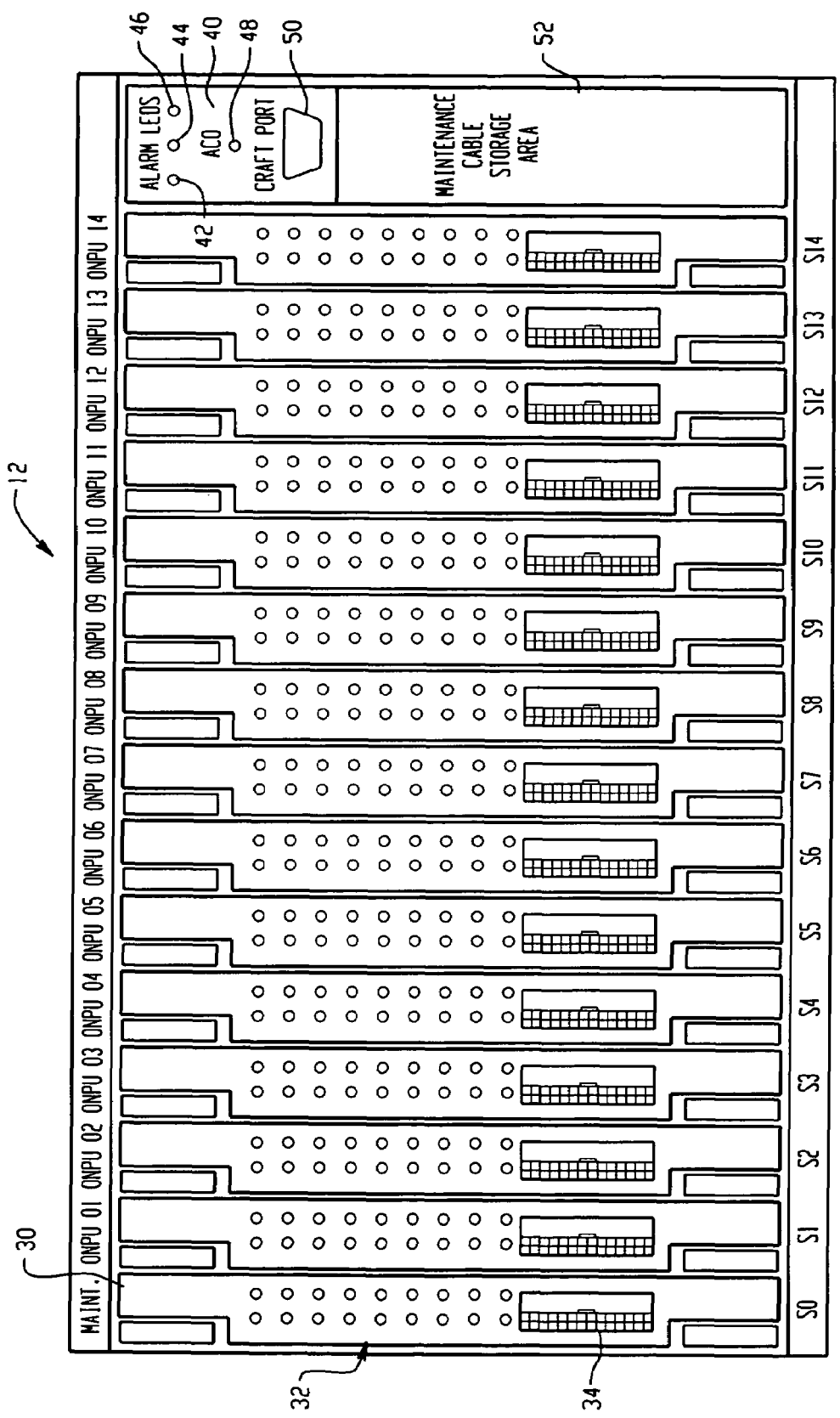
FIG. 3 is a front view of an example power distribution shelf.

FIG. 3 is a front view of the example power distribution shelf 12. The example power distribution shelf 12 of FIG. 3 is fully populated with a power distribution circuit card 30 in each of the slots S0-S14. Each power distribution circuit card 30 includes a plurality of light emitting diodes (LEDs) 32 and a maintenance connector 34. In the example fiber optic implementation described above, each power distribution circuit card 30 may comprise an optical network power unit 30.

Each power distribution circuit card 30 is configured to receive the four power feeds 25, 26, 27 and 28 and source two power output channels from each power feed to provide eight power output channels. Accordingly, each power distribution circuit card 30 may provide power for up to eight optical network units 16. Distributing the eight power output channels over the four power feeds 25, 26, 27 and 28 minimizes any output failures caused by a failure in one of the power feeds 25, 26, 27 and 28 to only two power output channels. Other power distribution schemes may also be used, such as a single power feed or further distribution of the power feeds to eight separate power feeds.

The LEDs 32 provide a visual readout of the current operational status of a corresponding power distribution circuit card 30. The LEDs 32 may be configured to indicate whether a power output channel is enabled, disabled, or in a failure state. The LEDs 32 may be further configured to indicate other operational states and status of the power distribution circuit card 30.

An alarm module 40 is connected to the backplane 60 of the power distribution shelf 12 and provides general indications that a failure has been detected in the power distribution shelf 12. The alarm module 40 monitors the status of the power distribution circuit cards' 30 power output channels and classifies the failures according to a number of failures monitored. For example, LEDs 42, 44, 46 may be selectively energized to indicate a critical failure classification, a major failure classification, or a minor failure classification, respectively.

Failure monitoring may include summing the number of failed power output channels for all the power distribution circuit cards 30. For example, if ten or more power output channels have failed, the LED 42 may illuminate to indicate a critical failure. If two to nine power output channels have failed, then the LED 44 may illuminate to indicate a major failure, and if only one power output channel has failed and/or other failures have occurred that do not impact subscriber service, then the LED 46 may illuminate to indicate a minor failure. Each alarm condition may be accompanied by an audible alarm.

Failure monitoring may alternatively include estimating the number of subscribers impacted by failed power output channels. For example, each optical network unit 16 may facilitate voice, data and/or video communications with up to 12 subscribers. Thus, the alarm module may be configured to classify failure states based on the estimated number of subscribers impacted due to power failures by equating each failed power output channel to 12 impacted subscribers. Additionally, by configuring the optical network units 16 to provide the actual number of subscribers serviced by each optical network unit 16 to the broadband distribution shelf 14 and providing this subscriber data to the alarm module 40, the failure states may be classified by the actual number of impacted subscribers.

An alarm cut off LED 48 indicates whether an alarm cut off state has been activated. Activating the alarm cut off state may clear the audible alarm while not affecting the alarm LEDs 42, 44, and 46. The alarm module 40 may be further configured to clear the alarm cut off state and activate the audible alarm if a new failure classification or new failure state occurs. For example, the alarm module 40 may be configured to clear the alarm cut off state and activate the audible alarm if a new failure classification occurs of the same or greater classification. Alternatively, the alarm module 40 may be configured to clear the alarm cut off state and activate the audible alarm for any new failure classification.

An alarm module connector 50 provides a data port for interfacing with the alarm module 40. The alarm module connector 50 may be utilized to establish data communication with service equipment, such as a portable computing device utilized by a service technician. Alternatively, the alarm module 40 can also be connected to a system level control device which can relay alarm information to a network element manager.

Maintenance in response to the alarms reported by the alarm module 40 may require the replacement of a power distribution circuit card 30, during which service interruptions may occur for subscribers receiving communication data from optical network units 16 powered by the power distribution circuit card 30. Because each power distribution circuit card 30 may provide power to optical network units 16 that may collectively service 100 or more subscribers, it is desirable to minimize service interruption to the fewest number of subscribers.

To minimize such service interruptions, the backplane 60 is configured to facilitate maintenance operations by establishing electrical connections to utilize the power distribution circuit card 30 in slot S0 as a maintenance card that provides a redundant power source. During normal operation, the power distribution circuit card 30 in slot S0 does not provide power to optical network units 16. During a maintenance operation, however, the power distribution circuit card 30 in slot S0 is configured to provide power to the optical network units 16 associated with one of the other power distribution circuit cards 30 in slots S1-S14 that is undergoing maintenance.

Figure 4:
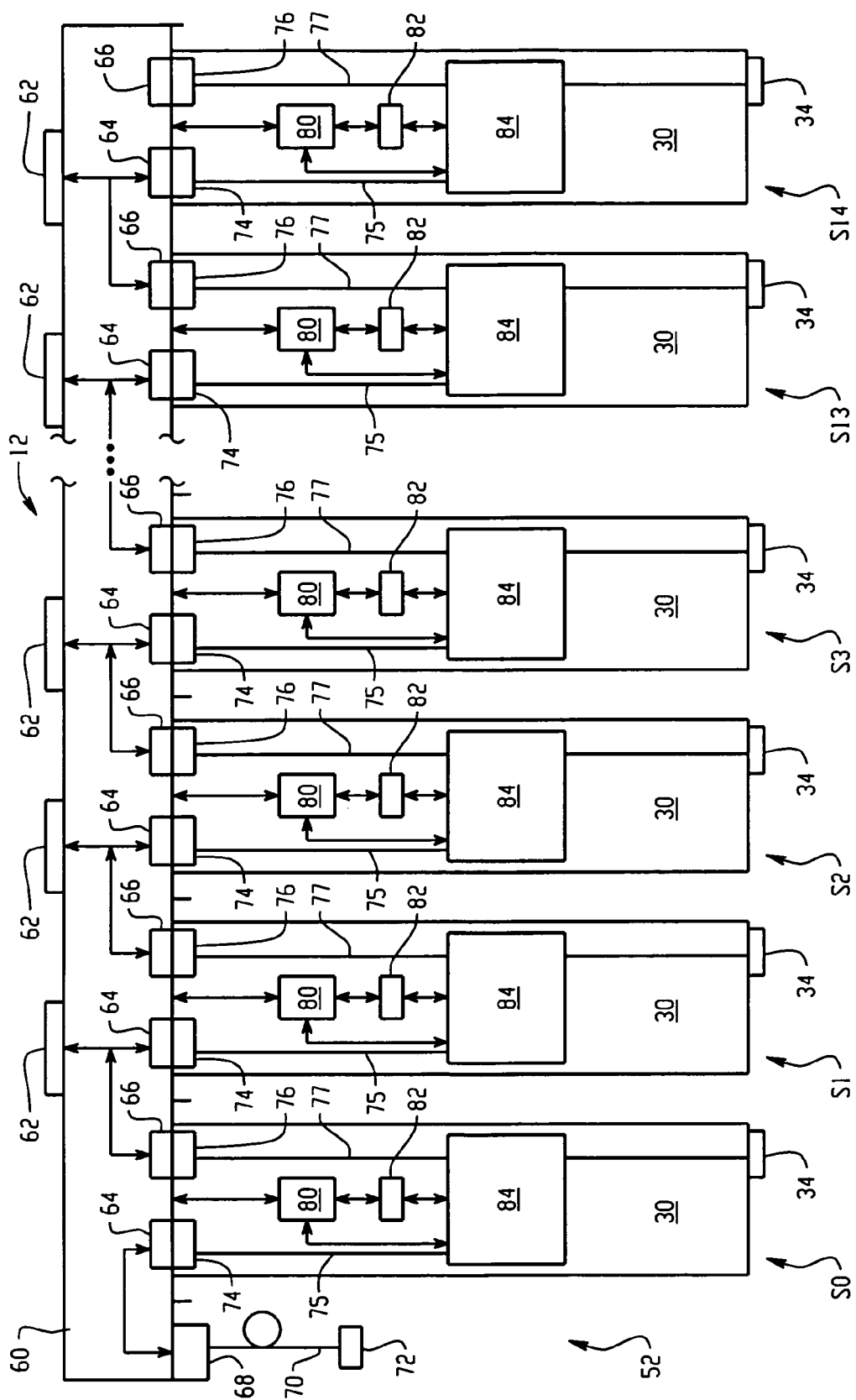
FIG. 4 is a block diagram of a plurality of power distribution circuit cards connected to a backplane in the example power distribution shelf.

FIG. 4 is a block diagram of the plurality of power distribution circuit cards 30 connected to the backplane 60 in the example power distribution shelf 12. Slot S0 defines a maintenance slot, and slots S1-S14 define primary slots. The backplane 60 includes corresponding backplane power connections 62 for each of the card slots S1-S14, first power output connectors 64 and second power output connectors 66 associated with each of the card slots S0-S14, and backplane power connections 68 associated with the maintenance slot S0 that define maintenance power connections 68. The maintenance power connections 68 are connected to the first power output connectors 74 of the maintenance slot S0, and the backplane power connections 62 of other corresponding card slots S1-S14 are connected to the first power output connectors 64 of their corresponding card slots and connected to the second power output connectors 66 of a corresponding adjacent card slot. Additionally, the maintenance power connections are connected to a cable 70 that terminates in a maintenance cable connector 72 that is configured to connect to any one of the maintenance connectors 34 of the power distribution circuit cards 30.

In the example power distribution shelf 12 of FIG. 4, card slots S0-S13 define adjacent card slots for S1-S14, respectively. The adjacent relationship is established by connecting the first power output connectors 64 of a card slot to the second power output connectors 66 of another card slot. For example, as shown in FIG. 4, card slot S0 is adjacent to card slot S1, and card slot S1 is adjacent to card slot S2, etc.

Each of the power distribution circuit cards 30 comprise first connectors 74 and second connectors 76. The first connectors 74 connect power output channels 75 that output DC power from the power circuitry 84 to the first power output connectors 64 in the backplane 60. The power circuitry 84 receives the input power from the power feeds 25, 26, 27 and 28 and generates power output signals for the power output channels 75. In the example power distribution shelf 12 of FIGS. 1-4, the power feeds 25, 26, 27 and 28 provide −48 VDC input power and the power circuitry 84 generates a −185 VDC power signal for the power output channels 75.

The second connectors 76 connect secondary power output channels 77 to the second power connectors 66, thereby connecting the secondary power channels 77 to the backplane power connections 62 in an adjacent card slot. The secondary power output channels 77 receive power from the power distribution circuit card 30 in the maintenance slot S0 during a maintenance operation and provide a temporary redundant power source for the backplane power connections 62 in an adjacent card slot, as explained below.

A processing subsystem 80 is in electrical communication with a data store 82 and the power circuitry 84. The data store 82 is configured to store power configuration data that is used by the power circuitry 84 to selectively power the output channels 75. The power configuration data may be used to indicate which power output channels 75 are to be energized. For example, if a power distribution circuit card 30 comprises eight power output channels and powers optical network units 16 on only two of the power output channels, then the power configuration data may indicate which two power output channels are to be energized. The power circuitry 84 may thus read the power configuration data to determine which two power output channels to selectively power.

The processing subsystem 80 is configured to communicate with other power distribution circuit cards 30 via the backplane 60, to store and retrieve data into the data store 82, and to operate the power circuitry 84. Additionally, the processing subsystem 80 is also configured to generate an output disable signal to disable the power output channels 75 of an adjacent power distribution circuit card 30 during a maintenance operation.

During a maintenance operation, a power distribution circuit card 30 may need to be removed and repaired or replaced. When a particular power distribution circuit card 30 is removed, the power distribution circuit card 30 in the maintenance slot S0 provides power to the backplane power connections 62 associated with the power distribution circuit card 30 that is being repaired or replaced.

To enable the power distribution circuit card 30 in the maintenance slot S0 to act as a redundant power source, the maintenance cable connector 72 is connected to the maintenance connector 34 of the power distribution circuit card 30 adjacent to the failed power distribution circuit card 30. For example, if the power distribution circuit card 30 in slot S3 needs to be replaced, then the maintenance cable connector 72 is connected to the maintenance connector 34 of the power distribution circuit card 30 in slot S2. Upon connection of the maintenance cable 70 to the power distribution circuit card 30, the power distribution circuit card 30 in the maintenance slot S0 receives a maintenance cable connection signal. The power distribution circuit card 30 in slot S0 then requests the slot identifier of the power distribution circuit card 30 to which the maintenance cable connector 72 is connected. For example, if the maintenance cable connector 72 is connected to the maintenance connector 34 of the power distribution circuit card 30 in slot S2, then the requested slot identifier is S2.

Upon receiving the requested slot identifier, the power distribution circuit card 30 in the maintenance slot S0 requests the power configuration data of the power distribution circuit card 30 in the adjacent slot. For example, if the slot identifier received is S2, then the configuration data for slot S3 is requested.

Upon receiving the configuration data for the power distribution circuit card 30 that has failed, the power distribution circuit card 30 in the maintenance slot S0 energizes its power output channels 75 according to the configuration data and instructs the power distribution circuit card 30 in the adjacent slot to generate a disable signal to disable the power output channels 75 of the failed power distribution circuit card 30. For example, upon receiving the configuration data for the power distribution circuit card 30 in slot S3, the power distribution circuit card 30 in slot S0 will energize its power output channels 75 and instruct the power distribution circuit card 30 in slot S2 to generate the disable signal.

The disable signal, in turn, causes the power distribution circuit card 30 in slot S3 to disable its power output channels 75. The backplane power connections 62 associated with slot S3, however, receive necessary power signals from the power distribution circuit card 30 in the maintenance slot S0. Therefore, the power output channels 75 of the power distribution circuit card 30 in slot S0 are coupled to the power circuitry 84 of the power distribution circuit card 30 in the adjacent slot S2 via the maintenance cable 70 and maintenance connector 34. Through this connection, the power circuitry 84 of the power distribution circuit card 30 in the adjacent slot S2 couples the power output channels 75 of the power distribution circuit card 30 in the maintenance slot S0 to the backplane power connections 62 associated with slot S3 via the secondary power output channels 77, the second connectors 76, and the second power connectors 66. In this manner, the power distribution circuit card 30 in slot S3 may be removed without affecting service to the optical network units 16 that receive power from the backplane power connections 62 of slot S3.

While the power circuitry 84 is shown as coupling the secondary power output channels 77 to the maintenance connector 34, these channels 77 may also be directly connected to the maintenance connector 34.

Once a replacement power distribution circuit card 30 is inserted into slot S3, the power distribution circuit card 30 in slot S0 sends the stored configuration data to the newly inserted power distribution circuit card 30. The replacement power distribution circuit card 30 in slot S3 may then energize its power output channels 75, and the maintenance cable 70 may be removed from the adjacent power distribution circuit card 30 in slot S2. Note that if the power distribution circuit card 30 in slot S1 fails, the maintenance cable 70 may be connected to the maintenance connector 34 of the power distribution circuit card 30 in slot S0.

Figure 5:
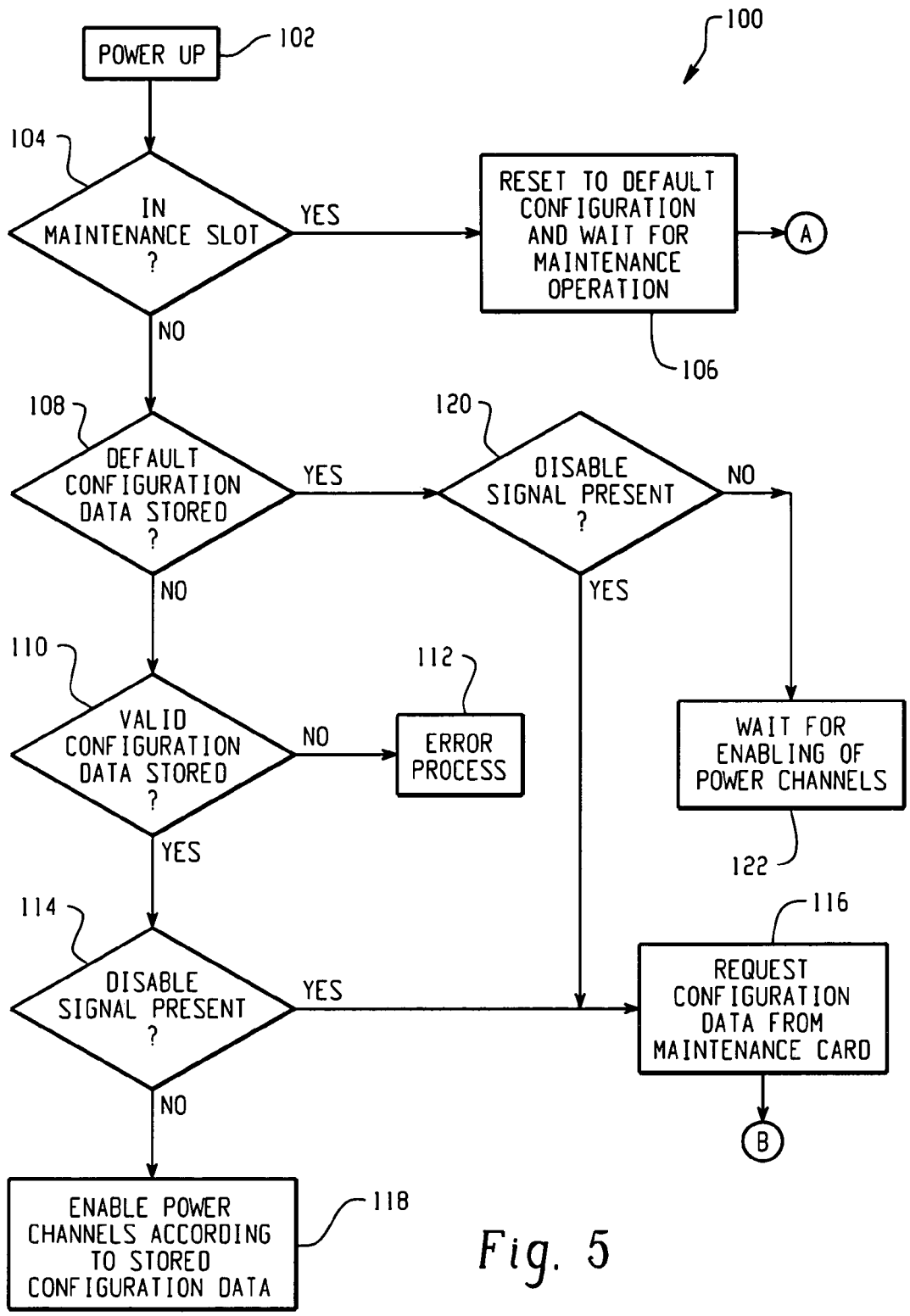
FIG. 5 is an example power-up flow diagram for a power distribution circuit card.

FIG. 5 is an example power-up flow diagram 100 for a power distribution circuit card 30. A power-up to energize the card circuitry is performed at 102. Upon successful power-up, a determination of whether the power distribution circuit card 30 is in the maintenance slot S0 is performed at 104. Upon a positive determination, a reset of the power distribution circuit card 30 to a default configuration is performed at 106 and the and the power distribution circuit card 30 waits for a maintenance operation to commence. An example default configuration is placing all of the power output channels 75 in a disabled state.

If the power distribution circuit card 30 is not in a maintenance slot, it is determined at 108 if default configuration data is stored. Default configuration data may comprise a factory default setting, such as placing all the power output channels 75 in a disabled state. If default configuration data is not stored, it is determined at 110 if valid configuration data is stored. If valid configuration data is not stored, then at 112 an error process is performed.

If valid configuration data is stored, then it is determined at 114 if a disable signal from an adjacent power distribution circuit card 30 is present. The presence of a disable signal indicates that the power distribution circuit card 30 is being inserted as a replacement card. Thus, if a disable signal is present, then at 116 a request for configuration data from the power distribution circuit card 30 in the maintenance slot S0 is issued. If a disable signal is not present, however, then the power channels 75 are enabled according to the stored configuration data.

Returning to 108, if default configuration data is stored, then at 120 it is determined if a disable signal is present. If a disable signal is present, then at 116 a request for configuration data from the power distribution circuit card 30 in the maintenance slot S0 is issued. If a disable signal is not present, however, then at 122 the power distribution circuit card 30 waits for enabling of the power output channels 75. This latter function is typically performed when there is no configuration data available for a particular card slot, such as during an initial installation of the power distribution shelf 12 or reconfiguration of the power distribution shelf 12 by adding or removing optical network units 16 in the communication system 10. In such situations the power distribution circuit card 30 may be manually configured by a technician.

Figure 6:
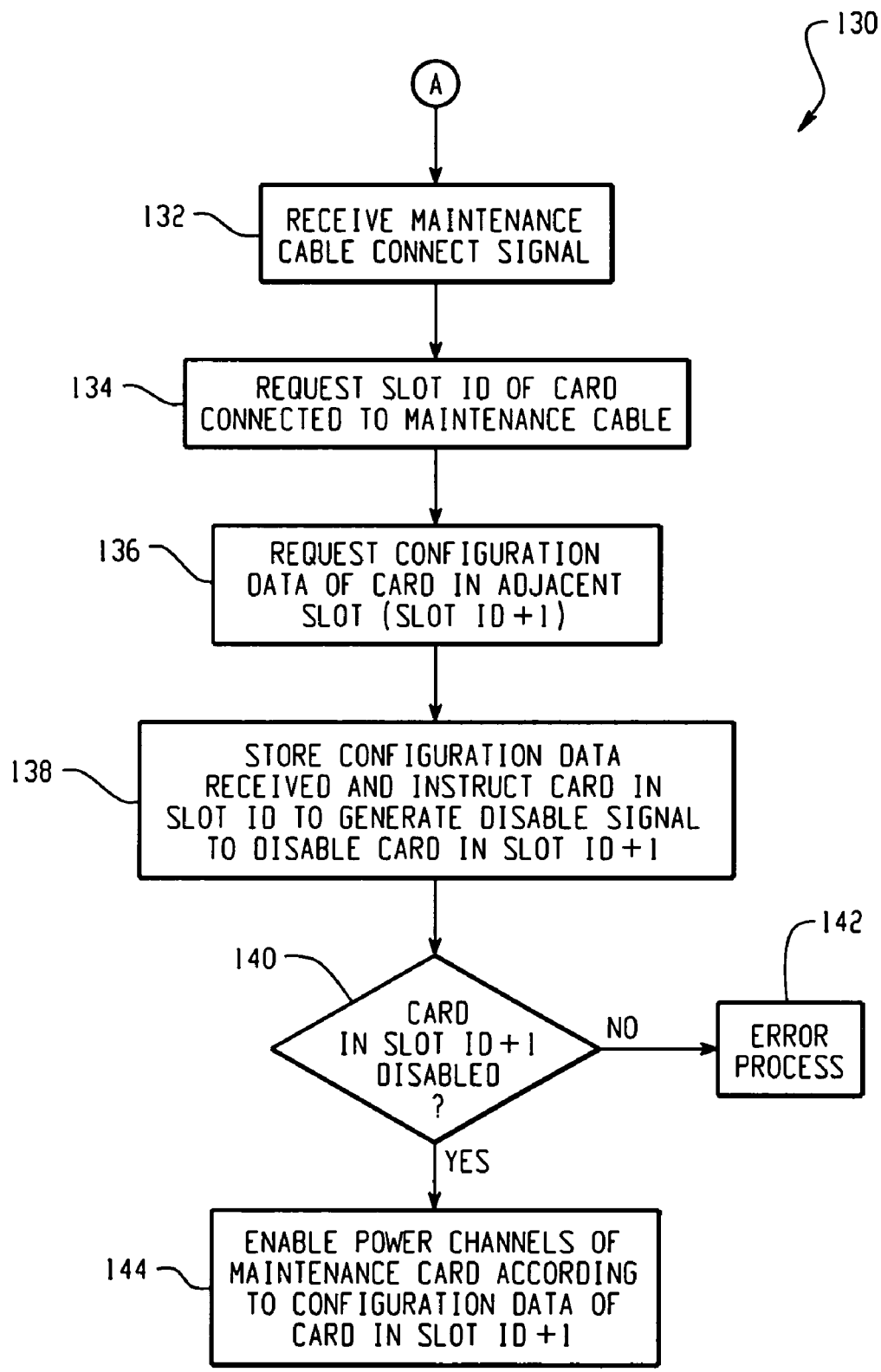
FIG. 6 is an example maintenance flow diagram for the example power distribution shelf.

FIG. 6 is an example maintenance flow diagram 130 for the example power distribution shelf. The flow diagram 130 may be performed by the power distribution circuit card 30 in the maintenance slot S0 in response to a reset of the power distribution circuit card 30 to a default configuration at 106 of FIG. 5.

At 132, the power distribution circuit card 30 in slot S0 waits to receive a maintenance cable connect signal. Upon receiving the maintenance cable connect signal, the power distribution circuit card 30 in slot S0 requests the slot ID of the power distribution circuit card 30 connected to the maintenance cable 70, as shown at 134. After receiving the slot ID, the power distribution circuit card 30 in slot S0 requests the configuration data of the power distribution circuit card 30 in the adjacent slot (e.g., slot ID+1), as shown in 136. Upon receiving the configuration data request, the power distribution circuit card 30 in the adjacent slot sends the configuration data to the power distribution circuit card 30 in the maintenance slot S0. At 138, the received configuration data is stored in the power distribution circuit card 30 in slot S0 and the power distribution circuit card 30 connected to the maintenance cable 70 is instructed to generate a disable signal to disable the power output channels of the power distribution circuit card 30 in the adjacent card slot.

At 140 it is determined whether the power distribution circuit card 30 in the adjacent slot is disabled. If the power distribution circuit card 30 in the adjacent slot is not disabled, then at 142 an error process is performed. If, however, the power distribution circuit card 30 in the adjacent slot is disabled, then at 144 the power distribution circuit card 30 in the maintenance slot S0 enables its power channels 75 according to the configuration data received from the power distribution circuit card 30 in the adjacent slot. Power signals are provided to the backplane connections 62 associated with the adjacent slot via the maintenance cable 70 and the secondary power channels 77. Accordingly, power is provided to the optical network units 16 associated with the failed power distribution circuit card 30 and the failed card may be removed and replaced without interrupting service to the associated optical network units 16.

Figure 7:
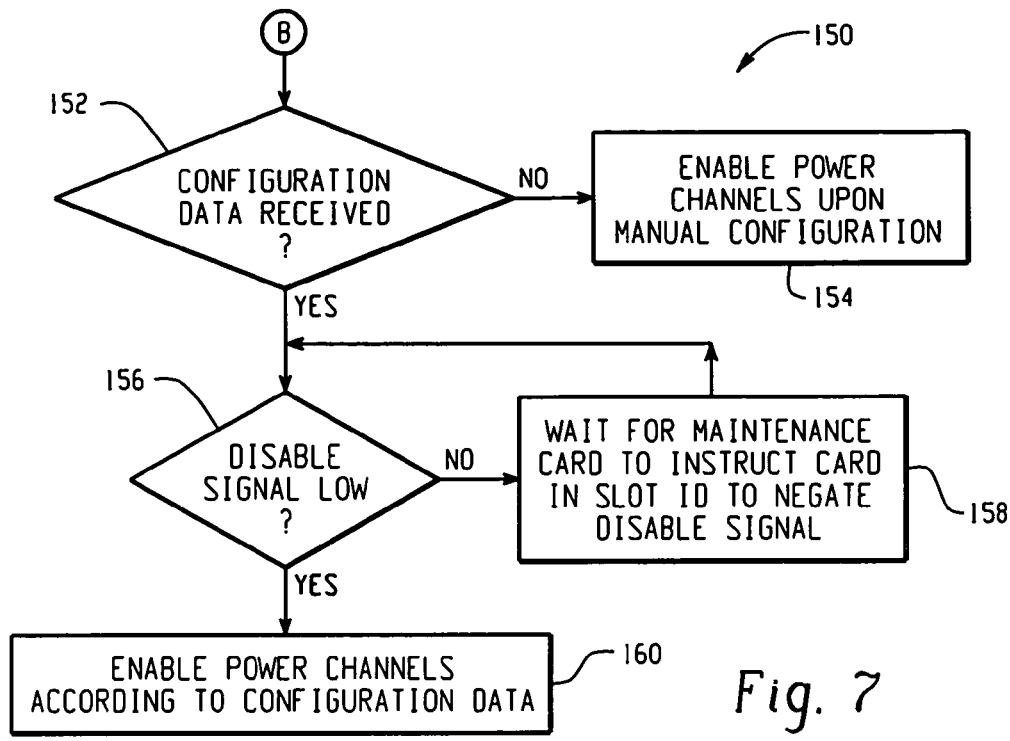
FIG. 7 is an example configuration flow diagram for a power distribution circuit card.

FIG. 7 is an example configuration flow diagram 150 for a power distribution circuit card 30. The flow diagram 150 may be performed by a power distribution circuit card 30 inserted into a card slot to replace a failed power distribution circuit card 30.

At 152 it is determined if configuration data has been received from a power distribution circuit card 30 in the maintenance slot S0. If configuration data has not been received after a specified time period, then at 154 the power channels are enabled upon a manual configuration. If, however, configuration data has been received, then at 156 it is determined if the disable signal is low. If the disable signal is not low, then at 158 the power distribution circuit card 30 waits for the power distribution circuit card 30 in slot S0 to instruct the adjacent card to negate the disable signal. Once the disable signal is negated, the power channels 75 are enable according to the configuration data at 160.

Figure 8:
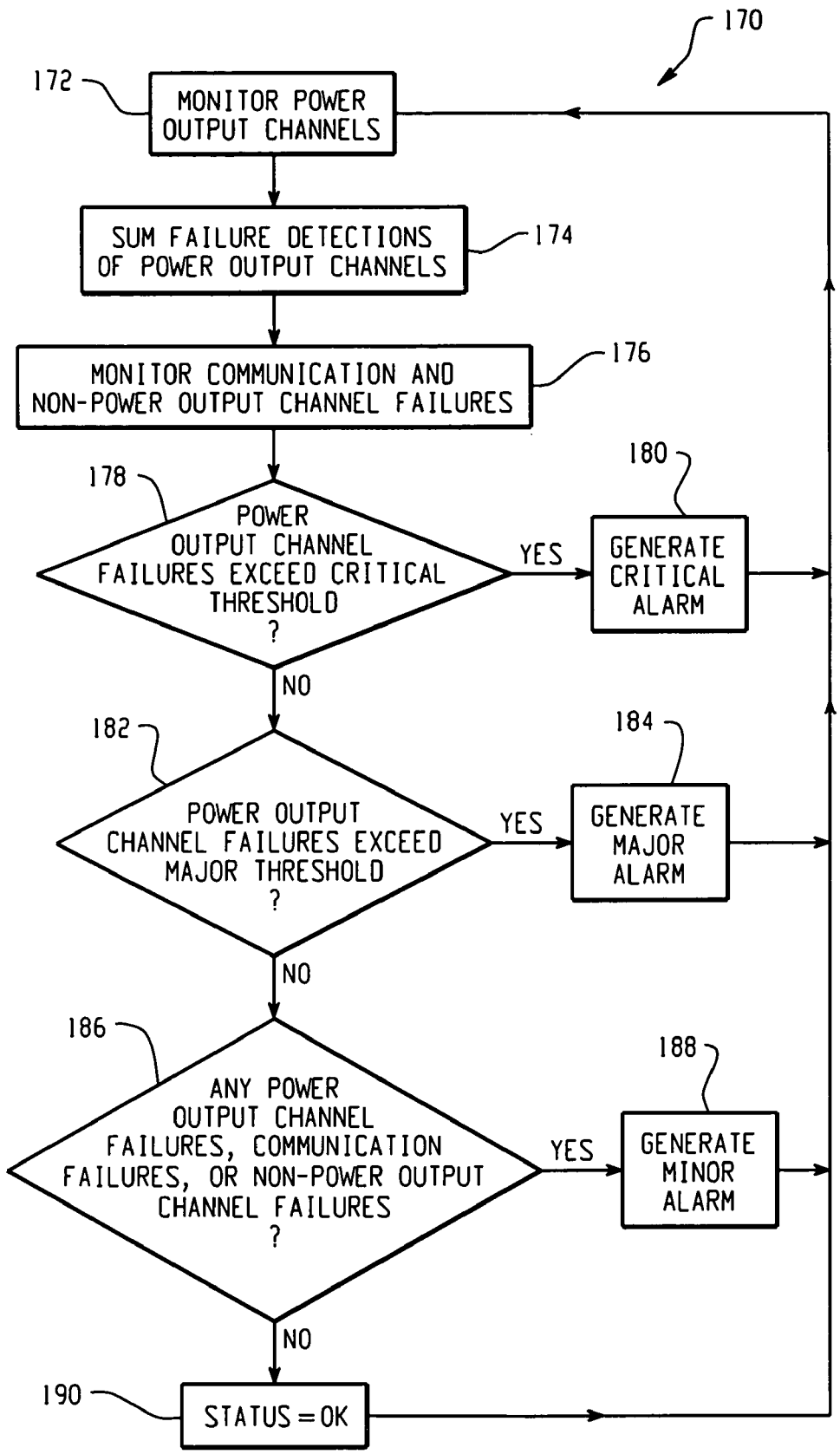
FIG. 8 is an example monitoring flow diagram for a power distribution shelf.

FIG. 8 is an example alarm monitoring flow diagram 170 for a power distribution shelf 12. The flow diagram 170 may be performed by the alarm module 40. At 172 the power output channels of the power distribution circuit cards 30 are monitored for failures, and at 174 the failures detected on the power output channels are summed. At 176 the power distribution circuit cards 30 are monitored for communication and other non-power output channel failures.

At 178 it is determined if the power output channel failures exceed a critical threshold. The critical threshold may correspond to the number of power output channel failures or the number of subscribers affected by the power output channel failures. If the critical threshold is exceeded, then a critical alarm signal is generated at 180.

If the critical threshold is not exceeded, then it is determined at 182 if the power output channel failures exceed a major threshold. The major threshold may correspond to the number of power output channel failures or the number of subscribers affected by the power output channel failures. If the major threshold is exceeded, a major alarm signal is generated at 184.

If the major threshold is not exceeded, then at 186 it is determined if any power output channels have failed, or if any communication or non-power output channel failures have occurred. If any power output channels have failed, or if any communication or non-power output channel failures have occurred, then a minor alarm signal is generate, otherwise an "OK" status is maintained at 190.

Figure 9:
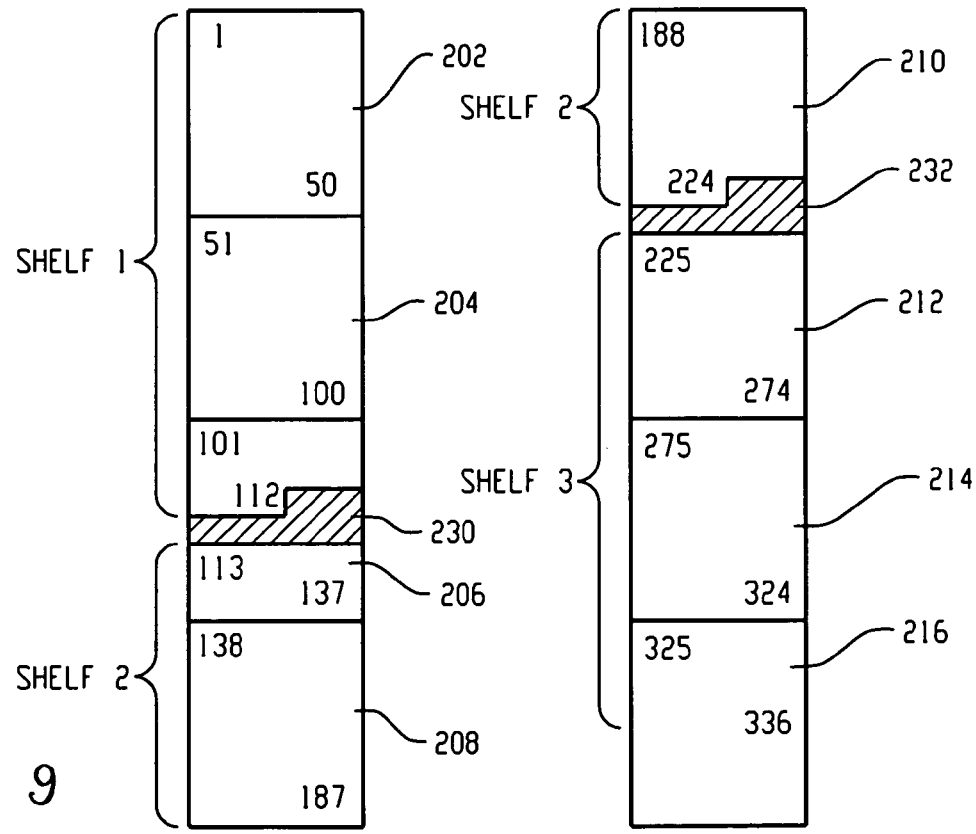
FIG. 9 is an example quiet front block configuration for a plurality of power distribution shelves.

FIG. 9 is an example quiet front block configuration for a plurality of power distribution shelves 12. The example configuration of FIG. 9 is designed for three 15-card shelves having 14 power distribution circuit cards 30, each of which is configured to provide power to up to eight optical network units 16. Each power distribution shelf 12 may also include a maintenance slot that is configured to receive a power distribution circuit card 30 for maintenance operations.

The quiet front blocks 202, 204, 206, 208, 210, 212, 214 and 216 each provide fifty terminal pairs that may be sequentially designated and are used to couple power channels 75 from the power distribution circuit cards 30 to a cross-connect for connection to corresponding optical network units 16.

The quiet front blocks 202, 204, 208, 212, 214 and 216 are fully populated, while the quiet front blocks 206 and 210 are partially populated. The partial population of quiet front blocks 206 and 210 requires the termination of 13 terminal pairs, and may be better understood with reference to FIG. 10, which illustrates an example cabling scheme from the backplane of the power distribution shelves 12a, 12b and 12c to the quiet front blocks 202, 204, 206, 208, 210, 212, 214 and 216. Each quiet front block 202, 204, 206, 208, 210, 212, 214 and 216 is configured to receive two standard 25-pair (50 conductor) cables. Because each power distribution shelf 12a, 12b, and 12c may provide power for up to 112 optical network units, 112 conductor pairs are required for each power distribution shelf 12a, 12b, and 12c.

Given that a distribution unit 10 may include one or more power distribution shelves 12, the backplanes 60 of the power distribution shelves 12a, 12b, and 12c are connectorized so that they may be placed in any shelf location in the distribution unit 10. Accordingly, each power distribution shelf 12a, 12b, and 12c has five 25-pair cables attached to the backplane 60. For example, the backplane 60 of power distribution shelf 12a has 25-pair cables 220a, 222a, 224a, 226a and 228a. Because only 112 conductor pairs are required, the remaining 13 pairs in the 25-pair cable 228a are unused. This cabling scheme is repeated for power distribution shelves 12b and 12c.

Figure 10:
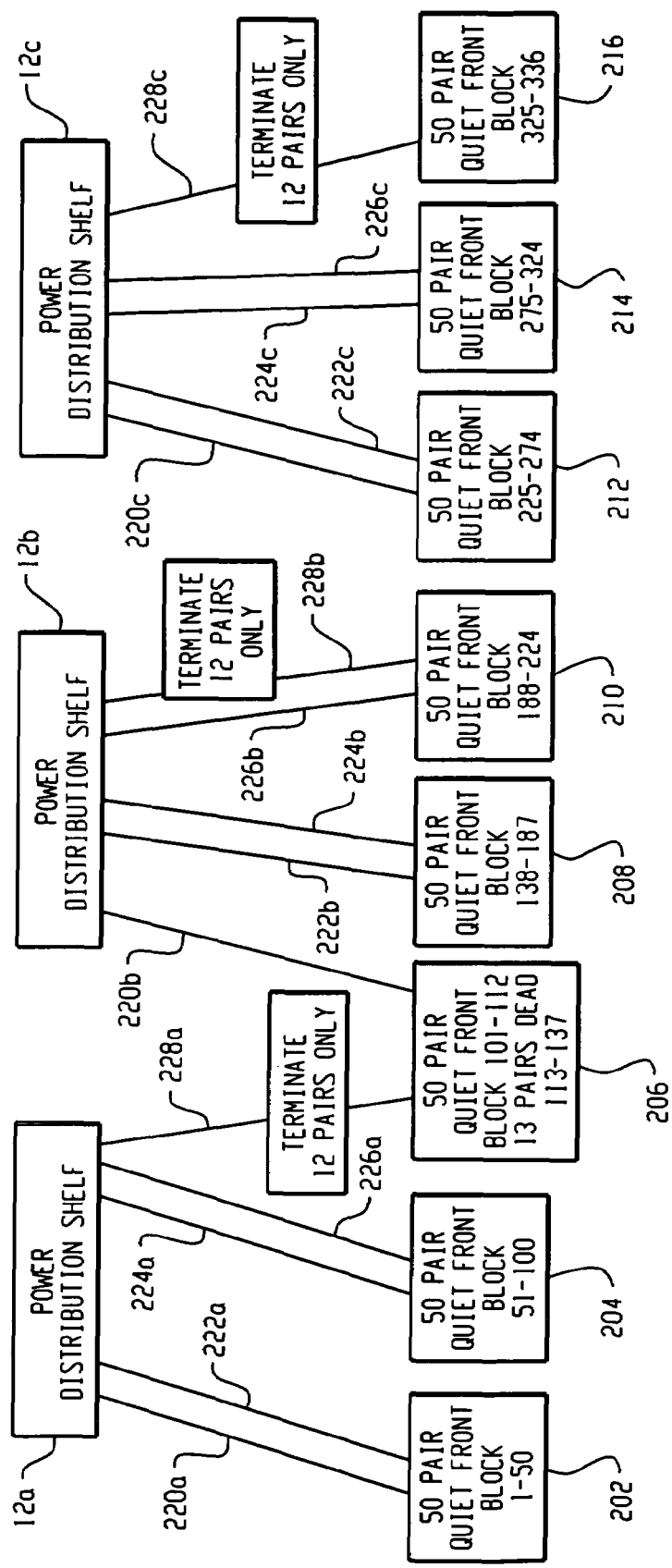
FIG. 10 is an example cabling scheme from the backplane of the power distribution shelves to facilitate the example cabling scheme of FIG. 9.

The quiet front blocks 202, 204, 206, 208, 210, 212, 214 and 216 may thus be readily connected to the connectorized backplanes 60 of the power distribution shelves 12a, 12b and 12c as shown in FIG. 10. Because the first 25 terminal pairs of the quiet front block 206 are connected to cable 228a, the remaining 13 terminal pairs of the first 25 terminal pairs of the quiet front block 206 are unused. To facilitate ease of maintenance and avoid confusion, a terminal cover 230 may be attached to the partially populated quiet front block 206 to prevent access to the unused terminal pairs. The quiet front block 210 is configured in a similar manner, except that the remaining 13 terminal pairs of the last 25 terminal pairs are unused and covered by a terminal cover 232.

The cabling scheme of FIGS. 9 and 10 facilitates a standardized manufacturing process for the power distribution shelves 12a, 12b and 12c and allows for ease of installation in the field. In the example configuration shown, the installing party need only attach a terminal cover to the remaining 13 terminal pairs of either the first 25 terminal pairs or second 25 terminal pairs of a partially populated quiet front block.

By terminating unused conductors in a terminal cable of a power distribution shelf (e.g., cables 228a, 228b and 228c) and not utilizing corresponding conductor pairs in a corresponding quiet front block (e.g., quiet front blocks 206 and 210), the cabling scheme of FIGS. 9 and 10 can be modified to facilitate other standardized cabling and quiet front block configurations.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A power distribution system, comprising:
   a chassis including a plurality of card slots defining primary slots and a maintenance slot; and
   a backplane including corresponding power connections for each of the primary slots and a first maintenance connector, first power output connectors associated with the primary slots, second power output connectors associated with the maintenance slot and primary slots, and third power output connectors associated with the maintenance slot, the corresponding power connections connected to the first power output connectors of the primary slot and connected to the second power output connectors of an adjacent primary slot or the maintenance slot, and the first maintenance connector connected to the third power output connectors of the maintenance slot;
   wherein the chassis is configured to selectively provide power to the power connections of a selected primary slot from the maintenance slot by establishing electrical communication between the first maintenance connector and the second power output connectors of a card slot adjacent to the selected primary slot during a maintenance state.

2. The power distribution system of claim 1, further comprising a plurality of power distribution circuit cards, each power distribution circuit card configured to provide power to a plurality of processing circuit cards and configured to be received in either the primary slots or the maintenance slot, each power distribution circuit card including:
   a plurality of power output channels configured to be coupled to the first power output connectors in the primary slots or the third power output connectors in the maintenance slot and to provide power to the first power output connectors or the third power output connectors;
   a second maintenance connector configured to be coupled to the second power output connectors and to be coupled to the first maintenance connector; and
   a processing subsystem configured to generate an output disable signal to disable the power output channels of an adjacent power distribution circuit card.

3. The power distribution system of claim 2, wherein the power distribution circuit cards further include:
   power circuitry configured to selectively power the plurality of power output channels according to power configuration data; and
   a data store configured to receive and store the power configuration data;
   wherein the processing subsystem is further configured to provide the stored power configuration data to a power distribution circuit card in the maintenance slot and to receive and store power configuration data received from a power distribution circuit card in the maintenance slot.

4. The power distribution system of claim 3, wherein the processing subsystem of the power distribution circuit cards is further configured to receive stored power configuration data for a power distribution circuit card and control the power circuitry to selectively power the plurality of power output channels according to the receive stored power configuration data for the power distribution circuit card.

5. The power distribution system of claim 2, further comprising an alarm subsystem configured to monitor failures in the power output channels for the plurality of power distribution circuit cards and to generate failure classification signals based on a number of failures monitored.

6. The power distribution system of claim 2, wherein the failure classification signals comprise a major failure classification signal, a critical failure classification signal, and a minor failure classification signal.

7. The power distribution system of claim 2, wherein power distribution circuit cards comprise optical network power units.

8. The power distribution system of claim 7, wherein each power output channel in each optical network power unit is operable to provide power to an optical network unit in a fiber optic communication network.

9. The power distribution system of claim 1, further comprising:
   a plurality of quiet front blocks associated with the corresponding power connections1 each of the quiet front blocks having a plurality of terminal connections, one of the quiet front blocks defining a partially populated quiet front block utilizing only a subset of the plurality of terminal connections for connection to the corresponding power connections; and
   a plurality of electrical cables connecting the plurality of quiet front blocks to the corresponding power connections, each of the electrical cables having a plurality of conductors, one of the electrical cables defining a terminal cable utilizing only a subset of the plurality of conductors to connect the partially populated quiet front block to corresponding power connections.

10. A power distribution system, comprising:
    a chassis including:
       a plurality of card slots, one of the card slots defining a maintenance slot; and
       a backplane including corresponding backplane power connections for each of the card slots, first power output connectors and second power output connectors associated with each of the card slots, the backplane power connections of the maintenance slot defining maintenance power connections, the maintenance power connections connected to the first power output connectors of the maintenance slot and the backplane power connections of other corresponding card slots connected to the first power output connectors of their corresponding card slots and connected to the second power output connectors of a corresponding adjacent card slot;
    wherein the chassis is configured to selectively provide power to the backplane power connections of a selected card slot from the maintenance slot by establishing electrical communication between the maintenance power connections and the second power output connectors of a card slot adjacent to the selected card slot during a maintenance state.

11. The power distribution system of claim 10, wherein the chassis is configured to establish the electrical communication between the maintenance power connections and the second power output connectors of the card slot adjacent to the selected card slot during a maintenance state.

12. The power distribution system of claim 10, further comprising:
    a plurality of quiet front blocks associated with the corresponding backplane power connections, each of the quiet front blocks have a plurality of terminal connections, one of the quiet front blocks defining a partially populated quiet front block utilizing only a subset of the plurality of terminal connections for connection to the corresponding backplane power connections; and
    a plurality of electrical cables connecting the plurality of quiet front blocks to the corresponding backplane power connections, each of the electrical cables having a plurality of conductors, one of the electrical cables defining a terminal cable utilizing only a subset of the plurality of conductors to connect the partially populated quiet front block to the corresponding backplane power connections.

13. A power distribution circuit card configured to provide power to a plurality of processing circuit cards and configured to be received in a card slot, comprising:
    a plurality of power output channels configured to be coupled to and provide power to power output connectors associated with the card slot;
    a processing subsystem configured to generate an output disable signal to disable a plurality of power output channels of an adjacent power distribution circuit card and further configured to receive an output disable signal from another power distribution circuit card and disable the plurality of power output channels of the power distribution card during a maintenance state; and
    a maintenance connector configured to be coupled to maintenance power channels and to be coupled to maintenance power connections associated with the card slot so that the maintenance power connections are in electrical communication with the maintenance power channels.

14. The power distribution system of claim 11, wherein the power distribution circuit cards further include:
    power circuitry configured to selectively power the plurality of power output channels according to power configuration data; and
    a data store configured to receive and store the power configuration data;
    wherein the processing subsystem is further configured to provide the stored power configuration data to a power distribution circuit card in the maintenance slot and to receive and store power configuration data received from a power distribution circuit card in the maintenance slot.

15. The power distribution system of claim 14, wherein the processing subsystem of the power distribution circuit cards is further configured to receive stored power configuration data for a power distribution circuit card and control the power circuitry to selectively power the plurality of power output channels according to the receive stored power configuration data for the power distribution circuit card.

16. The power distribution system of claim 10, further comprising a plurality of power distribution circuit cards, each power distribution circuit card configured to provide power to a plurality of processing circuit cards and configured to be received in the card slots, each power distribution circuit card including:
    a plurality of power output channels configured to be coupled to and provide power to the first power output connectors;
    a maintenance connector configured to be coupled to the second power output connectors and to be coupled to the maintenance power connections; and
    a processing subsystem configured to generate an output disable signal to disable the power output channels of a power distribution circuit card during a maintenance state.

17. The power distribution system of claim 16, wherein the power output channels disabled by the output disable signal comprise the power output channels of an adjacent power distribution circuit card.

18. The power distribution system of claim 16, wherein the power output channels disabled by the output disable signal comprise the power output channels of the power distribution circuit card.

19. The power distribution system of claim 16, further comprising an alarm subsystem configured to monitor failures in the power output channels for the plurality of power distribution circuit cards and to generate failure classification signals based on a number of failures monitored.

20. The power distribution system of claim 16, wherein power distribution circuit cards comprise optical network power units.

21. The power distribution system of claim 16, wherein the electrical communication between the maintenance power connections and the second power output connectors of the card slot adjacent to the selected card slot during a maintenance state is established through a cable configured to connect the maintenance power connections to the maintenance connector.

22. The power distribution circuit card of claim 13, further comprising:
  power circuitry configured to selectively power the plurality of power output channels according to power configuration data; and
  a data store configured to receive and store the power configuration data;
  wherein the processing subsystem is further configured to provide the stored power configuration data to a power distribution circuit card in a maintenance slot and to receive and store power configuration data received from a power distribution circuit card in the maintenance slot.

23. The power distribution circuit card of claim 22, wherein the processing subsystem of the power distribution circuit card is further configured to receive stored power configuration data for power distribution circuit card to be maintained and control the power circuitry to selectively power the maintenance power channels according to the receive stored power configuration data.

24. The power distribution circuit card of claim 23, wherein the power distribution circuit card comprises an optical network power unit.

25. A power distribution method, comprising:
  providing power to a plurality of power outputs from associated power output channels in a plurality of power distribution circuit cards;
  defining pairs of first and second power distribution circuit cards in the plurality of power distribution circuit cards;
  defining a maintenance power distribution circuit card in the plurality of power distribution circuit cards; and
  maintaining a second power distribution circuit card by:
    coupling the power output channels of the maintenance power distribution circuit card to the first power distribution circuit card;
    disabling the power output channels of the second power distribution circuit card; and
    coupling the power output channels of the maintenance power distribution circuit from the first power distribution circuit card to the plurality of power outputs associated with the power channels of the second power distribution circuit card.

26. The power distribution method of claim 25, further comprising:
  storing power configuration data for selectively enabling and disabling the power output channels of a power distribution circuit card for each of the power distribution circuit cards;
  utilizing the stored power configuration data of the second power distribution circuit card to be maintained in the maintenance power distribution circuit card to selectively enable and disable the power output channels of the maintenance power distribution circuit card.

* * * * *